April 27, 1954 — E. F. KLESSIG ET AL — 2,676,466

POWER TRANSMISSION

Original Filed May 2, 1950 — 3 Sheets-Sheet 1

INVENTOR.
ERNST F. KLESSIG
GLENN M. JONES
BY
ATTORNEY

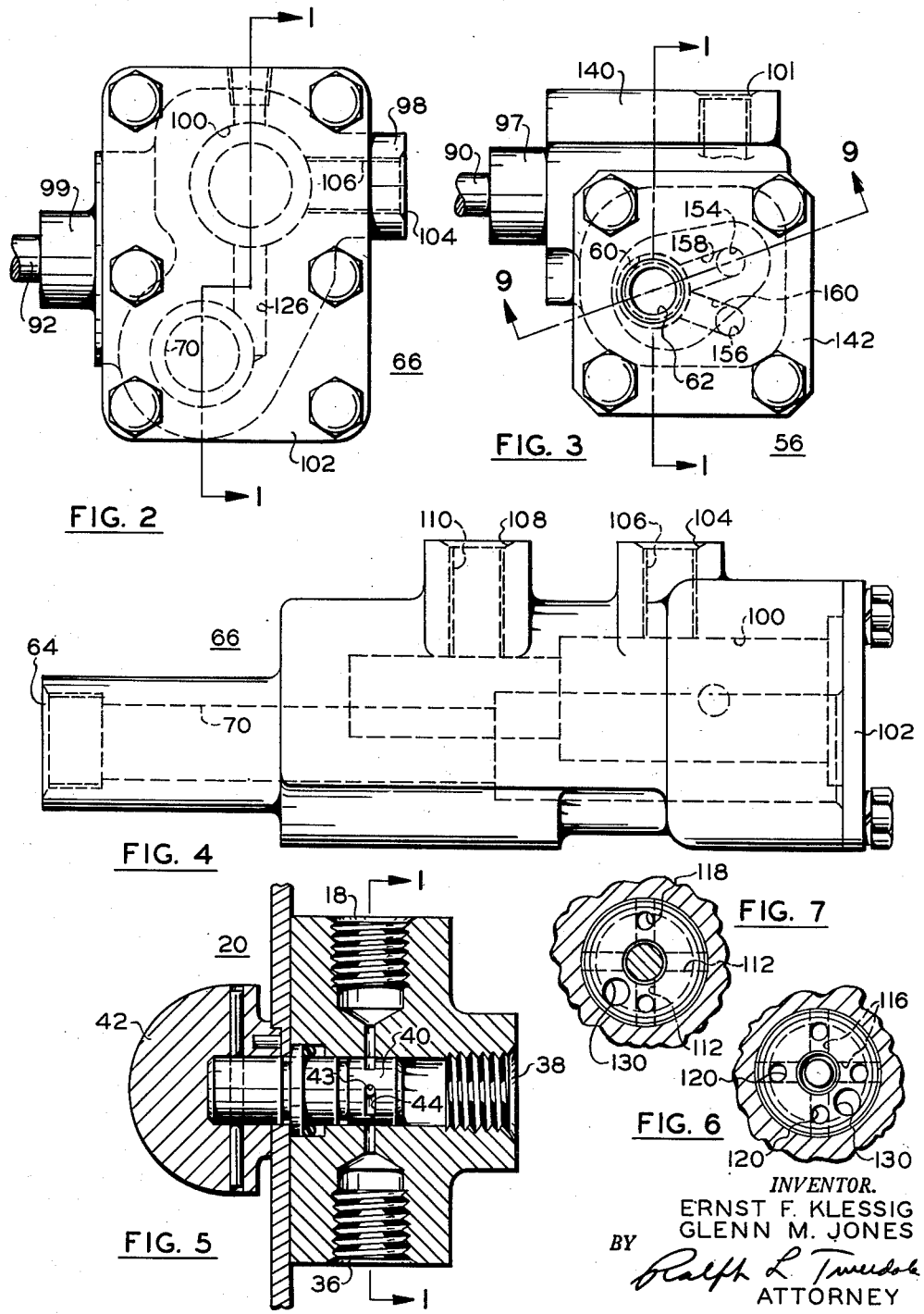

April 27, 1954     E. F. KLESSIG ET AL     2,676,466
POWER TRANSMISSION
Original Filed May 2, 1950     3 Sheets-Sheet 3
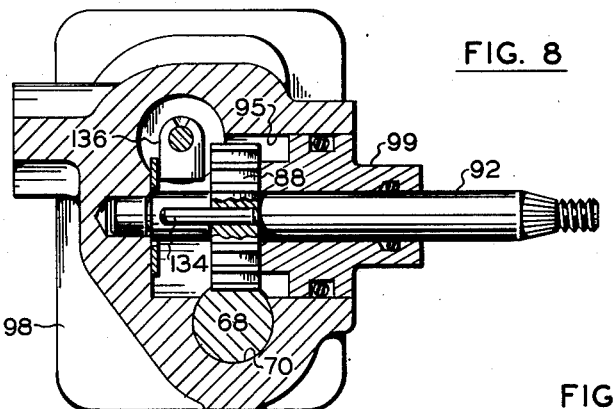
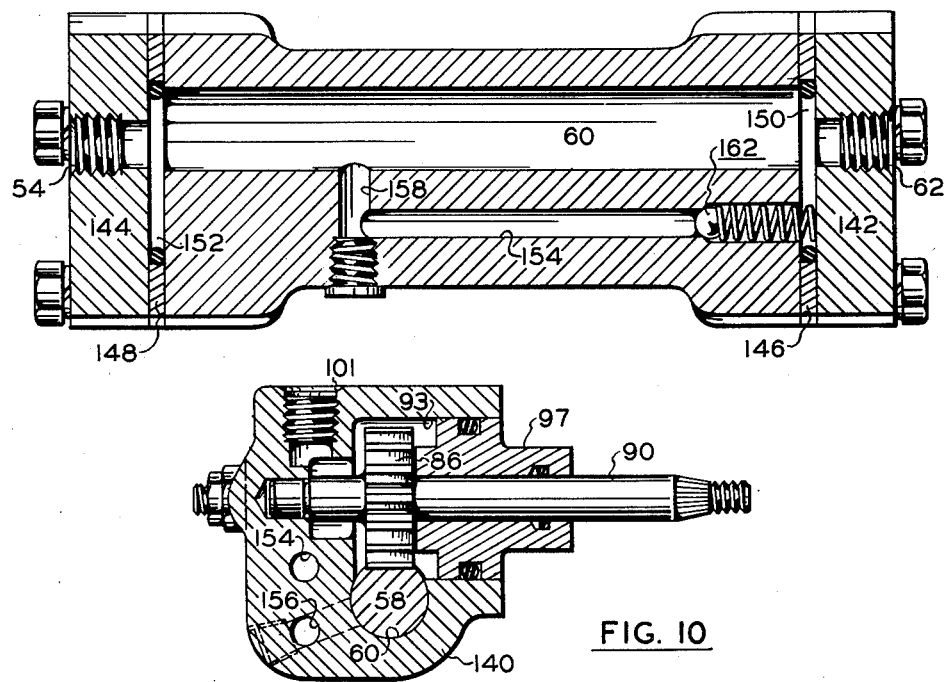
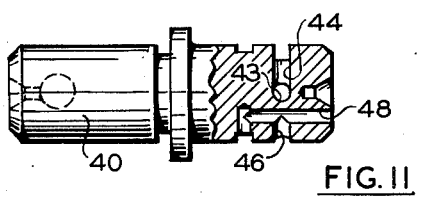
*INVENTOR.*
ERNST F. KLESSIG
GLENN M. JONES
BY
ATTORNEY Patented Apr. 27, 1954

2,676,466

UNITED STATES PATENT OFFICE 2,676,466

POWER TRANSMISSION

Ernst F. Klessig, Berkley, and Glenn M. Jones, Farmington, Mich., assignors to Vickers Incorporated, Detroit, Mich., a corporation of Michigan Original application May 2, 1950, Serial No. 159,492. Divided and this application November 8, 1952, Serial No. 319,524

10 Claims. (Cl. 60—97)

This invention relates to power transmissions, and is particularly applicable to those of the type comprising two or more fluid pressure energy translating devices, one of which may function as a pump and another as a fluid motor.

The present application constitutes a division of the copending application of Ernst F. Klessig and Glenn M. Jones filed under Serial Number 159,492 on May 2, 1950, now abandoned, in which a power transmission of the above type is disclosed.

The invention is generally concerned with hydraulic power transmission systems for simultaneously operating a pair of load devices and in particular with a transmission system which will also operate the pair of load devices in continuous reversing cycles.

In general, one embodiment of the invention comprises a hydraulic transmission system having a pressure fluid source and a pair of reversible fluid motors which are adapted to be separately associated with a pair of load devices for driving the same. The motors may be of the cylinder-reciprocating piston type having two ports which alternate as inlet and outlet ports for the delivery of pressure fluid to and the exhaust of fluid from opposite sides of the piston. A circuit is provided wherein a port of one of the motors is continuously connected to the pressure fluid source while the other port of said motor is connected in a closed or series relationship to one of the ports of the other motor.

The latter motor has a greater (or lesser) fluid displacement in one direction of operation than the displacement of the first motor in either direction of operation. Automatically operated control valve means is connected to the remaining port of the latter motor to alternately connect the remaining port of said motor to the pressure fluid source or to exhaust. Valve means may also be provided for selectively controlling the speed of the motors and for stopping the motors. The invention in its preferred form utilizes control means which will stop the motors at one end of their stroke rather than at some intermediate stage of their operation.

One adaptation for the system is for operating the windshield wipers of vehicles such as trucks and busses. The system may be economically installed on such vehicles as a branch circuit of a hydraulic system including a pressure fluid source which operates, for example, the brakes and doors of the vehicle.

It is therefore an object of the invention to provide a hydraulic transmission system for driving a pair of load devices in unison and in continuous reversing cycles.

It is another object of this invention to provide a system as above mentioned which will be economical, efficient, and long lasting.

It is another object of this invention to provide a hydraulic transmission system as above stated which includes means for selectively operating the pair of motors in continuous reversing cycles, for controlling the speed of the motors, and for stopping the motors at one end of their strokes rather than at an intermediate stage of their strokes.

It is a further object of this invention to provide a novel pilot valve operated directional control valve of the differential area fluid actuated type.

It is still another object of this invention to provide a directional control valve of the above type which is controlled by a pilot valve telescopically mounted within the directional control valve.

Further objects and advantages of the present invention will be apparent from the following description, reference being had to the accompanying drawings wherein a preferred form of the present invention is clearly shown.

In the drawings:

Figure 2 is a right end view of the upper fluid motor shown in Figure 1.

Figure 3 is a right end view of the lower fluid motor shown in Figure 1.

Figure 4 is a plan view of the upper motor shown in Figure 1.

Figure 5 is a sectional view of the directional control valve shown in the upper left portion of Figure 1.

Figure 6 is a view taken on line 6—6 of the upper fluid motor shown in Figure 1.

Figure 7 is a view taken on line 7—7 of the upper fluid motor shown in Figure 1.

Figure 8 is a view taken on line 8—8 of the upper fluid motor shown in Figure 1.

Figure 9 is a view taken on line 9—9 of Figure 3 of the body of the lower fluid motor shown in Figure 1.

Figure 10 is a view taken on line 10—10 of the lower fluid motor shown in Figure 1.

Figure 11 is a sectional view taken on line

Figure 1:
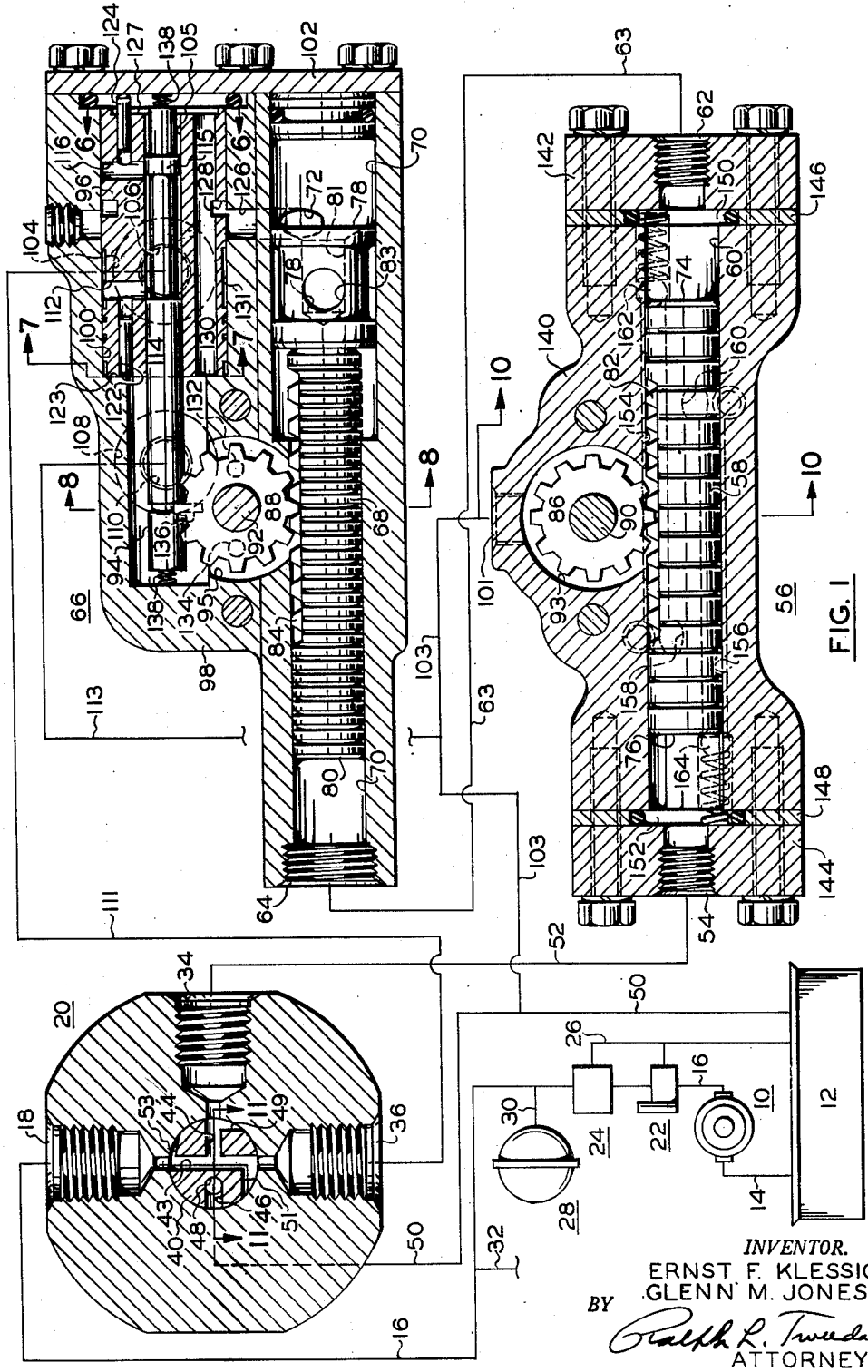
Figure 1 is a diagrammatic view of a hydraulic power transmission system incorporating in section directional control valve mechanism and a pair of reversible fluid motors, the parts in section being taken on lines 1—1 of Figures 2, 3 and 5.

11—11 of the control piston of the directional control valve shown in the upper left portion of Figure 1.

Referring to Figure 1 there is shown a hydraulic power transmission system comprising a pump 10 driven by a prime mover, not shown, and connected to a fluid tank 12 by a supply conduit 14 and connected by a pressure delivery conduit 16 to an inlet port 18 of a manually operated, rotary control valve 20. Incorporated in the pressure delivery conduit 16 is a pressure relief valve 22 and an unloading valve 24, both of which may be of the conventional type. The unloading valve 24 will bypass the complete delivery of the pump to the tank 12 by means of a tank conduit 26 whenever a predetermined pressure arises in an accumulator 28 which is connected to the pressure delivery conduit 16 by means of a branch conduit 30. A conduit 32, also connected to the pressure delivery conduit 16, may be utilized for delivery of pressure fluid to another part of the transmission (not shown) for operation of other load devices.

The relief valve 22 is provided as a safety element in case the unloading valve fails to operate satisfactorily, and will operate in the conventional manner to bypass pressure fluid from the pump 10 at a higher predetermined pressure than that of the unloading valve.

In addition to the pressure port 18 the control valve 20, also shown in Figures 5 and 11, is provided with two motor ports 34 and 36 and a tank port 38. When a piston 40 of the valve 20, which is manually rotatable by a control knob 42, is in the position shown in Figure 1, the pressure delivery port 18 is connected to both of the motor ports 34 and 36 while the tank port 38 is blocked from communication with all other ports. When the control knob is rotated 90° the pressure port 18 is connected to the motor port 34 while the motor port 36 is connected to the tank port 38. This is accomplished by means of a transverse passage 43 extending completely through the piston connected to which is a radial passage 44 leading to the periphery of the piston, and by means of another radial passage 46 connected to a longitudinal passage 48, the latter of which extends to the end of the piston 40 opposite the control knob 42, and which is in alignment with and leads to the tank port 38. In the position shown in Figure 1, the transverse passage 43 connects the pressure port 18 to the motor port 36, and the radial passage 44, in cooperation with the transverse passage 43, connects the motor port 34 to the pressure port 18.

The radial passage 44 and the transverse passage 43 at one end thereof are provided with enlarged slots indicated by the numerals 49 and 51 at the periphery of the piston. In addition, a narrow slot, indicated by the numeral 53, is provided at the periphery of the piston at the other end of the transverse passage 43 which, when the control valve is in operating position, is adapted to control the speed of a pair of fluid motors to which the motor ports are connected. When the control valve is rotated to operating position, the enlarged slots come into registry with the motor ports just before the metering slot comes into contact with the pressure port. The pressure port may be selectively opened partially or fully to the motor ports in order to control the speed of the motors.

The tank 38 is connected to the tank 12 by a conduit 50. The motor port 34 of the control valve 20 is connected by a conduit 52 to a port 54 located at one end of a reversible fluid motor 56 of the oppositely acting expansible chamber type and having a piston 58 reciprocably mounted within a longitudinal bore 60. The opposite end of the motor 56 is provided with a port 62 which is connected by a conduit 63 to a port 64 located at one end of a second reversible fluid motor 66 of the same type as motor 56 and having a piston 68 reciprocably mounted within a longitudinal stepped ore 70. The second motor 66 is provided with a port 72 near its opposite end which is controlled by valve mechanism to be later described. The opposing faces or pressure effective surface areas of the piston 58 of the motor 56, and which are indicated by the numerals 74 and 76, are substantially equal while the opposing end faces or pressure effective surface areas of the piston 68 of the motor 66, and which are indicated by the numerals 78 and 80, are unequal. Due to the fact that the right end of the piston 68 is slightly hollow, the hollow section being indicated by the numeral 81, the pressure effective surface area 78 comprises the end surface of the piston surrounding the hollow section and the end wall at the termination of the hollow section, the total area being equivalent to the area of the enlarged section of the bore. It is preferred that the surface area 80 of the piston 68 be substantially equal to the surface areas 74 and 76 of the piston 58, and that the surface area 78 of the piston 68 be substantially larger than the surface areas 74 and 76 of the piston 58. In this manner, because of the differential piston effective surface areas, or, stated in another manner because of the larger fluid displacement of the motor 66 in one direction of operation, when the left and right end surface areas 76 and 78 of the pistons 58 and 68 are simultaneously exposed to the pressure fluid source, the motor 66 will be operated in a leftward directional movement and the displacement from said motor will operate the motor 56 in a leftward directional movement. When the piston is in its complete rightward position, the enlarged portion of the piston closes the port 72. Thus provision has been made for initially shifting the piston leftwardly by means of a plurality of transverse ports 83 in the enlarged section of the piston leading to the hollow section 81. Pressure fluid is conducted from the port 72 to the hollow section 81 and the end face of the piston through the medium of the ports 83 until the end face of the piston breaks over the port 72 and the piston is then fluid operated leftwardly by the introduction of pressure fluid to the right end of the bore 70 through the port 72. The pistons 58 and 68 are respectively provided with gear racks 82 and 84, the latter of which are respectively adapted to rotate pinion gears 86 and 88 in mesh therewith so as to operate, for example, windshield wiper blades (not shown) which may be suitably fastened to shaft stems 90 and 92 (Figures 8 and 10) associated with the pinion gears 86 and 88 and extending from the motors 56 and 66.

During operation, as the pistons are hydraulically reciprocated, the pinion gears in mesh with the piston gear racks will be rotated and the shaft stems will also be rotated so that wiper blades (not shown) fastened to the stems will be operated in a swinging arc.

As shown in Figures 8 and 10 the pinion gears 86 and 88 are respectively mounted in stepped bores indicated by the numerals 93 and 95 extending from the front sides of the motors 56 and 66. The stepped bores 93 and 95 are closed, respectively, by closure members 97 and 99 which also serve as mounting boxes through which the shaft stems 90 and 92 extend from the motors 56 and 66. The motor 56 is provided with a port 101 connected directly to the smaller portion of the stepped bore 93 which permits leakage from the gear rack and pinion arrangement of the motor 56 to drain to tank by means of a conduit 103 connected to the port 101 and to the tank conduit 50 (Figure 1 and 10).

Referring to Figures 1, 6, and 7, for the purpose of causing the motors to be automatically operated in unison, and in continuous reversing cycles, there is provided telescopically arranged valvular mechanism associated with the motor 66 comprising a piston pilot valve 94 adapted to be operated by the motor 66 and which reciprocates within a bore 105 of a fluid operated sleeve valve 96. The pilot valve 94 is adapted to be operated near the end of each stroke of the motor 66 which causes hydraulic operation of the sleeve valve 96 in reversing cycles so as to connect the port 72, which is near the right end of the piston 68 of the motor 66, alternately to the pressure fluid source and to the tank.

The valvular mechanism may be mounted within and arranged as an integral part of the motor 66. For this purpose, the body 98 of the motor 66 is provided with a longitudinal stepped bore 100, the open end of which is closed by an end plate 102 which also closes the bore 70 within which the motor piston 68 is mounted. An externally located pressure port 104 is connected to the enlarged portion of the stepped bore 100 by a pressure passage 106, and an externally located tank port 108 is connected to the smaller portion of the bore 100 by a passage 110.

The pressure port 104 is connected to the motor part 36 of the rotary control valve 20 by a conduit 111 and the tank port 108 is connected to the tank 12 by a conduit 113. Any leakage from the gear rack and pinion arrangement of the motor 66 is provided for by connecting the stepped bore 95, within which the pinion gear 88 is mounted, directly to the smaller portion of the stepped bore 100 within which one end of the piston valve 94 extends and to which the tank passage 110 is connected, the latter being connected to tank 12 by means of the conduit 113.

The tank passage 110 is in continual communication with the left end of bore 100, but, however, with the sleeve valve 96 mounted in the large end of the bore 100 the pressure passage 106 is closed from communication with the bore 100 except by the medium of a plurality of transverse ports 112 in the sleeve 96 extending from the outer periphery thereof and opening into the central bore 105 within which the piston valve 94 is located.

The piston valve 94 is provided with a long land 114 extending from the left end thereof to the central portion of the piston which permits continual communication between the pressure passage 106, the bore 105, and the sleeve ports 112. The piston valve 94 also has a second and much smaller land 115 which controls the admission of pressure fluid from the pressure passage 106 and bore 105 to a second plurality of transverse ports 116 in the sleeve valve 96 which also extend from the periphery of the sleeve valve to the central sleeve bore 105.

The sleeve valve 96 is hydraulically operated by a differential area arrangement which is shown more clearly in Figures 6 and 7. The differential area is provided by two floating pin holes 118 constructed in the sleeve and extending from the left end of the valve to the transverse ports 112, and four floating pin holes 120 extending from the right end of the sleeve valve to the transverse ports 116. Two duplicate pins 122, one of which is shown in Figure 1, are floatably mounted in the pin holes 118 while four duplicate pins 124, only one of which is shown in Figure 1, are floatably mounted in the holes 120.

The end plate 102 serves as an abutment for the right end of the pins 124 and also limits rightward movement of the sleeve valve 96 while the shoulder 123 of the bore 100 serves as an abutment for the left end of the pins 122 and also limits leftward movement of the valve 96. The right end of the valve 96 is connected to tank 12 by means of a groove 127 in the end of the valve 96 connected to which is one end of the longitudinal passage 130, the latter of which is connected to the tank by means of bore 100, passage 110, port 108, and conduit 113. The left end of the valve 96 is connected to tank by means of the smaller portion of the bore 100.

In the position of the sleeve and piston valves shown in Figure 1, pressure fluid from the pressure passage 106 is simultaneously directed by the piston valve 94 to the ports 116 and ports 112. Due to the greater number of pins being at the right end of the sleeve there is a greater resultant leftward force created so that the sleeve will be shifted to the complete leftward position shown. In the other position of the valve 96 the land 115 blocks the ports 116 from the pressure fluid source and a force equal to the pressure times the end area of the two pins is created to shift the valve 96 to the rightward position. The sleeve valve 96, in cooperation with the piston valve 94, is adapted to connect the right end of the motor 66 either to tank or to the pressure fluid source. In the position of the parts shown in Figure 1, the right end of the motor 66 is connected to the tank. This communication is established by means of a passage 126, one end of which constitutes the motor port 72, and the other end of which opens to the sleeve valve bore 109. A transverse tank port 128, constructed in the sleeve valve 96, leads directly to a longitudinal passage 130 extending completely through the sleeve and which opens at one end to the smaller left end section of the bore 100, the latter of which is connected to the tank. When the sleeve valve 96 is fluid operated in a rightward direction, the tank port 128 moves out of registry with the passage 126 and a pressure port 131 to the left of the tank port 128, and which is connected to the transverse ports 112, moves into registry with the passage 126 so as to disconnect the tank from and to connect the pressure fluid source to the right end of the motor 66. The piston valve 94 is actuated by the motor 66 near each end of its stroke by means of two dowel pins indicated by the numerals 132 and 134 fastened to the pinion gear 88 and extending therefrom, such pins being located 180° apart, which alternately contact a lever 136 fastened to and extending from the piston valve 94. When the pins 132 and 134 lose contact with the lever 136, the piston valve 94 is operated to and maintained in the neutral position shown by means of duplicate springs 138 abutting each end of the valve.

Means for maintaining the closed portion of the system comprising the conduit 63 connected to the left end of motor 66 and to the right end of motor 56 and thus insuring completion of operation of the motors has been provided for by a duplicate check valve and passage arrangement which may be formed integrally with the motor 56. Referring to Figures 1, 9, and 10, the body of the motor 56, indicated by the numeral 140, is provided with end caps 142 and 144 at opposite ends thereof which close the open ends of the longitudinal bore 60 within which the piston 58 is mounted. The end caps 142 and 144 are spaced apart from the end faces of the motor body 140 by means of spacers 146 and 148 having enlarged openings 150 and 152 (Figures 1 and 9) which connect the open ends of longitudinal passages 154 and 156 at the opposite ends of the motor body 140 to the opposite ends of the longitudinal bore 60 within which the motor piston 58 is mounted. The longitudinal passage 154 is connected directly to the piston bore 60 by an angular passage 158 which is adapted to be closed by the piston 58 except when the piston 58 has reached its complete rightward position. The longitudinal passage 156 is connected directly to the piston bore 60 by an angular passage 160, the latter of which is adapted to be closed by the piston 58 except when the piston 58 has reached its complete leftward position. Mounted in the longitudinal passages 154 and 156 are check valves, indicated generally by the numerals 162 and 164, which respectively permit flow from the longitudinal passage 154 to the right end of bore 60 and permit flow from the longitudinal passage 156 to the left end of bore 60.

Only one of the check valve and passage arrangements associated therewith will be effective during operattion. The duplicate arrangement is provided in case of the reversal of connections to the opposite ends of the motor 56. When the connections of the motor 56 are reversed, the pistons of the motors will be simultaneously operated in opposite directions. When the connections are as illustrated, the pistons will be simultaneously operated in the same direction.

If the connections to the motor 56 are as illustrated and the piston 58 has completed a rightward directional movement, and the piston 68 of the motor 66 has not completed its rightward directional movement, pressure fluid is connected to the left end of the motor 66 in order to complete the rightward directional movement of the piston 68 by reason of the angular passage 158, longitudinal passage 154, and check valve 162. If the connections to the motor 56 were reversed and the piston 58 had completed a leftward directional movement and the piston 68 had not completed its rightward directional movement, the piston 68 of the motor 66 will complete such movement because of the angular passage 160, longitudinal passage 156, and check valve 164. The duplicate auxiliary passage and check valve arrangement is also utilized when priming the system in addition to insuring synchronized and complete movement of the motor pistons.

Referring to Figure 1, in operation, with the parts in the position shown and with the accumulator 28 filled with pressure fluid from the pump 10 and the delivery from the latter being by-passed through the unloading valve 24 to the tank 12, pressure fluid from the accumulator 28 is delivered to the pressure port 18 of the rotary control valve 20 by means of branch conduit 30 and pressure delivery conduit 16.

In the position shown, the pressure delivery port 18 of the control valve 20 is connected to the motor port 34 and the motor port 36 while the tank port 38 is blocked from communication with all other ports. The control valve mechanism comprising sleeve valve 96 and piston valve 94 are in a position blocking the pressure passage 106 from the right end motor port 72 and connecting the latter port to the tank port 108. The pistons of the motors are at their intermediate stage of a rightward directional movement. The pressure fluid source is connected to the left end of the motor 56 by means of conduit 52, and although the pressure fluid source is connected by means of conduit 111 to the pressure port 104 of the valve mechanism of the motor 66, the pressure port 104 is closed by such valve mechanism from communication with the right end of motor 66. As the piston 58 of the motor 56 is operated rightwardly, fluid displacement from the right end of the motor is delivered to the left end of the motor 68 by conduit 63 and port 64 to operate the piston 68 of the motor 66 rightwardly in unison with the piston 58 of the motor 56. As the pistons are operated rightwardly the pinion gears 86 and 88 are operated counterclockwise by reason of being in mesh with the piston gear racks 82 and 84. Thus, if windshield wiper blades, for example, were fastened to the shaft stems of the pinion gears, they would be simultaneously operated in a swinging arc as the pinion gears were actuated by the pistons.

Fluid displacement from the right end of the motor 66 is delivered to the tank 12 by means of bore 70, port 72, passage 126, sleeve valve tank port 128, longitudinal passage 130, bore 100, passage 110, tank port 108, and conduit 113. When the right end of the piston has passed over port 72 fluid displacement is enabled to leave the right end of the bore 70 by reason of the ports 83 in the hollow section 81 of the piston 68.

As the piston 68 of the motor 66 nears a completion of a rightward directional movement, the dowel pin 132 associated with the pinion gear 88 comes in contact with the lever 136 and will actuate the piston valve 94. When the piston valve 94 is shifted leftwardly, the land 115 thereof closes the ports 116 from communication with the pressure passage 106. A reaction force equal to pressure times the end area of the two pins is created to shift the valve 96 rightwardly until abutment with the end plate 102. Fluid from the right end of the valve 96 is directed to tank 12 by means of groove 127, longitudinal passage 130, bore 100, passage 110, port 108, and conduit 113. When the sleeve valve 96 is operated rightwardly, the tank port 128 thereof passes out of registry with the passage 126, and the pressure port 131 of the sleeve valve registers with the passage 126 to admit pressure fluid to the right end of the motor 66 by means of the port 72 and plurality of piston ports 83. The accumulator is then simultaneously connected to the right end of the motor 66 and to the left end of the motor 56 but due to the larger pressure effective surface area 78 of the right end of the piston 68, the piston 68 will be operated leftwardly and the fluid displacement from the left end of the motor 66 will be directed by port 64 and conduit 63 to the right end of motor 56 to also shift the piston 58 thereof leftwardly. Fluid displacement from the left end of the motor 56 is added to the accumulator displacement to operate the motor 66. The displacement from the left end of motor 56 is directed to the pressure port 104 of the valve mechanism controlling motor 66 by means of conduit 52, port 34 of rotary control valve 20, radial passage 44, longitudinal passage 43, port 36, and conduit 111.

From the pressure port 104, pressure fluid is directed to the right end of the motor 66 by means of pressure passage 106, the transverse ports 112, port 131, passage 126, port 72, and piston ports 83. When the piston 68 has been operated leftwardly, a distance sufficient to uncover the port 72, pressure fluid is admitted directly to the right end of bore 70 through the ports 72.

When the piston 68 nears the end of its leftward movement, the pin 134 extending from the pinion gear 88 will contact the lever 136, and the piston valve 94 will be shifted to the right. When the piston valve 94 is shifted rightwardly, the pressure port 104 and pressure passage 106 are connected to the transverse ports 112 and to the transverse ports 116. Because of the differential area provided by the two floating pins in the left end of the sleeve valve 96 and the four floating pins in the right end of the valve, the valve will be fluid operated to the left until engagement with the shoulder 123. Fluid from the left end of valve 96 is directed to tank 12 by means of bore 100, passage 110, port 108, and conduit 113. The vale 96 is shifted leftwardly by the difference in force created by the pressure times the end area of four pins minus the pressure times the end area of two pins. The pressure port 131 of the valve 96 will move out of registry with the pressure passage 126, and the tank port 128 move into registry with the pressure passage 126. In this manner the pressure fluid source is disconnected from the right end of the motor 66 and the tank 12 connected thereto. As the pressure fluid source is continuously connected to the left end of the motor 56, the piston thereof is fluid operated in a rightward direction and the displacement from the right end of the motor 56 is directed to the left end of the motor 66 to operate the piston 68 thereof also in a rightward direction.

If, during operation, the piston 58 of motor 56 is operated completely in a rightward direction before the piston 68 of the motor 66 has completed its rightward stroke, the latter stroke will be completed by pressure fluid from the source being conducted from the left end of the bore 60 of the motor 56 to the left end of the bore 70 of the motor 66 by way of the port 158, longitudinal passage 154, check valve 162, and the port 62 of the motor 56, the conduit 63, and port 64 of the motor 66. The motors may be stopped at the completion of their rightward movement when the connections to the motor 56 are as illustrated, or, if the connections to the motor 56 are reversed, stopped at the completion of a rightward movement of the motor 56 and a leftward movement of the motor 66, by rotating the control valve piston 40 90° counterclockwise to the operating position shown in Figure 1. This comprises the motor stop position of the control valve 20 and places the motor port 36 into communication with the tank port 38 by means of the radial passage 46 and longitudinal passage 48, and places the motor port 34 in communication with the pressure port 18 by means of the transverse passage 43 and radial passage 44. Pressure fluid is then, instead of being connected to both of the motor ports 34 and 36, only connected to the motor port 34 from whence it is delivered to the left end of motor 56 by means of the conduit 52 to shift the piston thereof to the right. Fluid displacement from the right end of the motor 56 is conducted by the conduit 63 to the left end of the motor 66 to operate the piston 68 thereof also to the right. If the control valve 20 is operated to the motor stop position, for example, while the pistons are being actuated in a rightward direction such as is shown in Figure 1, the pistons will continue their movement until completion. The control valve mechanism comprising the sleeve valve 96 and piston valve 94 will be in the position shown, and fluid displacement from the right end of the motor 66 is directed to tank by means of the port 72 and passage 126, the sleeve valve tank port 128 and longitudinal passage 130, bore 100, passage 110, port 108, and conduit 113. If the control valve 20 is operated to the motor stop position while the pistons are being actuated in a leftward direction, the piston movements will be reversed to the rightward direction and their actuation to their stopped position will be as previously stated except that fluid displacement from the right end of the motor 56 will be conducted to the tank 12 by means of the motor port 72, passage 126, sleeve valve pressure port 131, the transverse ports 112, pressure passage and pressure port 106 and 104, conduit 111, motor port 36 of control valve 20, the transverse ports 46 and longitudinal passage 48 of piston 40, tank port 38, and conduit 50.

Thus, regardless of the position of the motor pistons, when the control valve 20 is operated to the motor stop position, the right end of the motor 56 will be connected to the tank 12. When the control valve mechanism is in the position shown, the tank port 128 of the sleeve valve 96 will be in registry with the passage 126 and the fluid displacement from the right end of the motor 56 will be conducted to the tank via the control valve mechanism and conduits 113 and 50. When the control valve mechanism is in the opposite position shown, the sleeve valve pressure port 131 will be connected to the passage 126, and fluid displacement from the right end of the motor will be conducted to the tank 12 via the control valve mechanism, conduit 111, control valve 20, and conduit 50. This arrangement of stopping the motors simultaneously at the completion of one of their strokes is particularly suited to a hydraulic transmission for driving windshield wipers as the windshield wipers may be automatically actuated to what is conventionally known as a parked position rather than at, or to, an intermediate position of their stroke.

In summary, the invention comprises a hydraulic transmission system having two reversible fluid motors which are continuously and simultaneously driven in reversing cycles. One end of one of the motors is continuously connected to a pressure fluid source, which in this case constitutes an accumulator which is constantly filled with pressure fluid at a predetermined pressure by a fluid pump through the cooperation of an unloading valve. The other end of this motor is connected by conduit means in a series or closed relationship to the smaller displacement end of the other reversible fluid motor. The remaining end of the latter motor is controlled by automatically operated valve mechanism so as to connect the port leading to such end of the motor alternately to the pressure fluid source and to exhaust. Due to the larger pressure effective surface area of the piston provided in the motor controlled by the automatically operated valve mechanism, when the pressure fluid source is connected simultaneously to both motors, the motor having the piston with the larger pressure effective surface area will be actuated and the displacement from the smaller end of such motor is utilized to operate the other motor. When the pressure fluid source is disconnected from the end of the motor with the piston having the larger pressure effective area and connected to exhaust instead, as the pressure fluid source is continuously connected to one end of the other motor, such motor will be actuated in the opposite direction and the displacement from such motor is utilized to actuate the remaining motor also in the opposite direction.

The motors will be simultaneously, continuously operated in reversing cycles until the control valve is operated to the motor stop position at which time the motors will be actuated to the completion of one of their strokes, rather than stopping the motors at some intermediate stage of their strokes.

The speed of the motors may be selectively controlled by partially or fully opening the metering slot 53 of the manually operated control valve 20. When the motors are being operated in a rightward directional movement, pressure fluid from the accumulator is throttled over the metering slot 53 to the left end of the motor 56 in order to control the speed of both motors. When the motors are being operated in a leftward directional movement, pressure fluid from the accumulator is throttled over metering slot 53 to the right end of motor 66 in order to control the speed of both motors. Thus, the arrangement is such that a single manually operated control valve controls the speed of both motors in both directions of operation. It should be noted also that control valve 20 also performs the function of controlling the starting and stopping of both motors.

While the form of embodiment of the invention as herein disclosed constitutes a preferred form, it is to be understood that other forms might be adopted, all coming within the scope of the claims which follow.

What is claimed is as follows:

1. In a hydraulic power transmission system for driving a pair of load devices in unison and in continuous reversing cycles the combination of a pressure fluid source, a pair of reversible fluid motors adapted to be separately associated with the load devices for driving the same, each of said motors including two ports which alternate as inlet and outlet ports and one of said motors having a different fluid displacement in at least one direction of operation from the displacement of the other motor in either direction of operation, means hydraulically connecting one of the ports of said other of the motors continuously to the pressure fluid source and the other port of said other motor to one of the ports of said one motor, and automatically operated control valve means alternately connecting the remaining port of the said one motor to the pressure fluid source and to exhaust.

2. In a hydraulic power transmission system for driving a pair of load devices in unison and in continuous reversing cycles the combination of a pressure fluid source, a pair of reversible fluid motors adapted to be separately associated with the load devices for driving the same, each of said motors including two ports which alternate as inlet and outlet ports and one of said motors having a different fluid displacement in at least one direction of operation from the displacement of the other motor in either direction of operation, means hydraulically connecting one of the ports of said other of the motors continuously to the pressure fluid source and the other port of said other motor to one of the ports of said one motor, and control valve means hydraulically connected to the remaining port of said one motor and operated by one of said pair of motors after a predetermined operational movement in each direction thereof for alternately connecting the remaining port of said one motor to the pressure fluid source and to exhaust.

3. In a hydraulic power transmission system for driving a pair of load devices in unison and in continuous reversing cycles the combination of a pressure fluid source, a pair of reversible fluid motors adapted to be separately associated with the load devices for driving the same, each of said motors including two ports which alternate as inlet and outlet ports and one of said motors having a different fluid displacement in at least one direction of operation from the displacement of the other motor in either direction of operation, means hydraulically connecting one of the ports of said other of the motors continuously to the pressure fluid source and the other port of said other motor to one of the ports of said one motor, two position control valve means for connecting the remaining port of said one motor alternately to the pressure fluid source and to exhaust, and means associated with the motor having the different fluid displacement in one direction of operation automatically operating the control valve means from one position to another after a predetermined operational movement of the motors in both directions.

4. In a hydraulic power transmission system for driving a pair of load devices in unison and in continuous reversing cycles, the combination of a pressure fluid source, a pair of reversible fluid motors adapted to separately drive the load devices, said motors being of the cylinder and piston type having two ports for alternately admitting and exhausting fluid from opposite sides of the piston for operating the same, the piston of one of said motors having at least one larger pressure effective surface area exposed to pressure fluid entering the port on that side of the piston than one of the pressure effective surface areas of the piston of the other motor, hydraulic conduit means continuously connecting the pressure fluid source to a port of said other motors and the other port of said other motor to a port of the said one motor, and control valve means automatically connecting the remaining port of the said one motor alternately to the pressure fluid source and to exhaust after a predetermined operational movement of the motors in both directions.

5. In a hydraulic power transmission system for driving a pair of load devices in unison and in continuous reversing cycles, the combination of a pressure fluid source, a pair of reversible fluid motors adapted to separately drive the load devices, said motors being of the cylinder and piston type having two ports for alternately admitting and exhausting fluid from opposite sides of the piston for operating the same, the piston of one of said motors having at least one larger pressure effective surface area exposed to pressure fluid entering the port on that side of the piston than one of the pressure effective surface areas of the piston of the other motor, hydraulic conduit means continuously connecting the pressure fluid source to a port of said other motor and the other port of said other motor to a port of the said one motor, two position control valve means for connecting the remaining port of the said one motor alternately to the pressure fluid source and to exhaust, and means associated with the motor having the piston with the larger pressure effective surface area automatically operating the control valve from one position to another after a predetermined operational movement of the motors in both directions.

6. In a hydraulic power transmission system for driving a pair of load devices in unison and in continuous reversing cycles, the combination of a first and a second reversible fluid motor, each of which has two ports which alternate as inlet and outlet ports and the first motor having a different fluid displacement in one direction of operation from the other motor in the opposite direction of operation, means continuously hydraulically connecting the pressure fluid source to a port of the second motor and the other port of said motor to a port of the first motor, control valve means for connecting the remaining port of the first motor alternately to the pressure fluid source and to exhaust, means for automatically operating the control valve means after a predetermined operational movement of the motors in each direction for causing simultaneous operation of and continuous reversing cycles of the motors, and control means for selectively stopping the motors by connecting the remaining port of the first motor to exhaust.

7. In a hydraulic power transmission system for driving a pair of load devices in unison and in continuous reversing cycles, the combination of a first and a second reversible fluid motor, both of which are of the type having a reciprocating piston and two ports which alternate as inlet and outlet ports for the admission and exhaust of fluid to and from opposite sides of the piston for operating the same, and the first motor having a different displacement in one direction of operation from the other motor in the opposite direction of operation, means forming a circuit continuously connecting the pressure fluid source to a port of the second motor and the other port of said motor to a port of the first motor, control valve means for connecting the remaining port of the first motor alternately to the pressure fluid source and to exhaust, means for automatically operating the control valve means at the ends of the motor strokes for causing simultaneous operation of the motors and in continuous reversing cycles, and control means for selectively stopping the motors at one end of their piston stroke by connecting the remaining port of the first motor to exhaust.

8. In a hydraulic power transmission system for driving a pair of load devices in unison and in continuous reversing cycles, the combination of a pressure fluid source, a pair of reversible fluid motors adapted to be separately associated with the load devices for driving the same, each of said motors including two ports which alternate as inlet and outlet ports, said motors having different displacements in at least one direction of their operation, means continuously connecting the pressure fluid source to one of the ports of one of the motors and the other port of said motor to one of the ports of the other motor, automatically operated control valve means alternately connecting the remaining port of the other motor to the pressure fluid source and to exhaust, and a single manually operated control valve for selectively starting, stopping, and controlling the speed of the motors.

9. In a hydraulic power transmission system for driving a pair of load devices in unison and in continuous reversing cycles, the combination of a pressure fluid source, a pair of reversible fluid motors adapted to be separately associated with the load devices for driving the same, each of said motors including two ports which alternate as inlet and outlet ports, said motors having different displacements in at least one direction of their operation, means continuously connecting the pressure fluid source to one of the ports of one of the motors and the other port of said motor to one of the ports of the other motor, automatically operated control valve means alternately connecting the remaining port of the other motor to the pressure fluid source and to exhaust, and a single manually operated control valve for selectively controlling the speed of the motors in both directions of operation.

10. In a hydraulic power transmission system for driving a pair of load devices in unison and in continuous reversing cycles, the combination of a pressure fluid source, a pair of reversible fluid motors adapted to be separately associated with the load devices for driving the same, each of said motors including two ports which alternate as inlet and outlet ports, said motors having different displacements in at least one direction of their operation, means continuously connecting the pressure fluid source to one of the ports of one of the motors and the other port of said motor to one of the ports of the other motor, automatically operated control valve means alternately connecting the remaining port of the other motor to the pressure fluid source and to exhaust, and a single manually operated control valve selectively controlling the flow of fluid to one of the motors for controlling the speed of both motors in one direction of their operation and controlling the flow of fluid to the other of said motors for controlling the speed of both motors in their opposite direction of operation.

References Cited in the file of this patent

UNITED STATES PATENTS

| Number | Name | Date |
|---|---|---|
| 500,580 | Mason | July 4, 1893 |
| 2,105,473 | Dean | Jan. 18, 1938 |
| 2,446,611 | Rose | Aug. 10, 1948 |

FOREIGN PATENTS

| Number | Country | Date |
|---|---|---|
| 36,829 | Germany | Mar. 11, 1886 |